United States Patent [19]

Gryspeerdt

[11] Patent Number: 5,334,103
[45] Date of Patent: Aug. 2, 1994

[54] INSITU ADJUSTABLE DUAL RANGE BELT DRIVE ASSEMBLY

[75] Inventor: Jose G. T. Gryspeerdt, Nevele, Belgium

[73] Assignee: Ford New Holland, Inc., New Holland, Pa.

[21] Appl. No.: 142,026

[22] Filed: Oct. 28, 1993

Related U.S. Application Data

[62] Division of Ser. No. 997,251, Dec. 9, 1992, Pat. No. 5,282,773, which is a division of Ser. No. 691,196, Apr. 25, 1991, Pat. No. 5,191,755.

[30] Foreign Application Priority Data

Apr. 26, 1990 [EP]  European Pat. Off. ............ EP90.201.055.2

[51] Int. Cl.$^5$ ................. F16H 59/00; F16H 55/52; F16H 9/12
[52] U.S. Cl. ........................... 474/18; 474/37; 474/171
[58] Field of Search ............ 474/8, 18, 24, 29, 35, 474/37, 46, 47, 171, 131

[56] References Cited

U.S. PATENT DOCUMENTS

| 3,643,519 | 2/1972 | Ebersold | 474/29 |
| 4,781,665 | 11/1988 | Walker | 474/133 |
| 4,820,242 | 4/1989 | Sato | 474/8 |
| 5,094,652 | 3/1992 | Sakakibara et al. | 474/46 X |

Primary Examiner—Roger J. Schoeppel
Attorney, Agent, or Firm—Larry W. Miller; Frank A. Seemar

[57] ABSTRACT

A variable diameter belt type power transfer assembly having a drive sheave and a driven sheave, both of which are adjustable and include a pair of opposing coaxial flanges, one of which is axially movable relative to the other, is disclosed wherein both flanges of the drive sheave are provided with first and second belt engaging surfaces flaring radially outwardly with respect to each other so as to define first and second variable diameter belt receiving grooves therebetween. A dual range of velocity ratios between the drive sheave and the driven sheave is obtainable by selectively positioning a drive belt in the respective variable diameter belt receiving grooves. The inner and outer flange portions of one sheave member are constructed to allow the outer sheave portion to be selectively located in an operative position and an axially spaced retracted position relative to the inner sheave portion.

6 Claims, 4 Drawing Sheets

INSITU ADJUSTABLE DUAL RANGE BELT DRIVE ASSEMBLY

CROSS-REFERENCE TO RELATED APPLICATIONS

This application is a divisional of U.S. patent application Ser. No. 07/997,251, filed Dec. 9, 1992, now U.S. pat. No. 4,282,773, which in turn is a divisional application of U.S. patent application Ser, No. 07/691,196, filed Apr. 25, 1991, issued as U.S. Pat. No. 5,191,755, on Mar. 9, 1993.

BACKGROUND OF THE INVENTION

The present invention is directed generally to a variable diameter power transfer assembly and, more particularly, to a dual range belt drive transmission for a combine harvester cleaning fan.

Variable diameter power transfer assemblies comprising a drive sheave and a driven sheave for transmitting power between two shafts and of which each sheave is composed of two flanges which are axially adjustable with respect to each other, are well known in the art. Typically, each cooperating pair of flanges forms a V-shaped belt receiving groove, the effective diameter of which can be varied by mechanical, hydraulic or electric means acting on the drive sheave flanges for adjusting the spacing therebetween, whereas compensating axial movement of the driven sheave flanges with respect to each other is controlled by a compression spring forcing said two sheave flanges together. The variable diameter power transfer assembly just described thus is capable of giving an infinite number of velocity ratios between the driving shaft and the driven shaft within a given range of values. An example of such a variable diameter power transfer assembly is disclosed in greater detail in EP-A-0.097.986 to which reference is made.

Due to constructive restrictions however, the mentioned range of velocity ratios is fairly limited and the power transfer assembly preferably is designed to adequately fulfil the common requirements whereby this assembly is unable however to efficiently handle less frequently occurring conditions for which either an excessive speed reduction or a speed increase out of the common would be demanded. Indeed, assuming the variable diameter power transfer assembly is operable to control the rotational speed of a fan incorporated in a combine harvester for assisting in the grain cleaning process, then the variable speed transmission is designed to perform fully satisfactory in crops and crop conditions for which the combine harvester is best suited such as for harvesting so called heavier grains such as wheat and corn. However, with a fan variator designed and set to tackle these heavier conditions, severe difficulties are encountered when harvesting very light grains, such as grass seed for example, which are easily made airborne and run the risk of being blown out of the combine.

One known solution for this recognized problem consists of shielding off the fan air inlets, thereby reducing the airflow through the fan. Unfortunately, the resultant air pattern in the combine cleaning system quite often becomes disrupted, adversely affecting the operation of the combine cleaning mechanism.

Another known solution to this problem has been to replace the variable speed transmission for obtaining a "high" speed range with a second variable speed transmission for obtaining a "low" speed range each time when switching over from harvesting the heavier grains to harvesting the lighter grains. Although functionally acceptable, it will be appreciated by one skilled in the art that this solution of replacing the drive components is expensive in that two variable speed transmissions are needed, and furthermore, this solution is also undesirable because of the time consuming effort involved for dismounting and mounting the respective variable speed transmissions.

Accordingly, it would be desirable to provide a variable speed belt drive transmission in which dual speed ranges can be provided simply by re-orienting the sheave components without requiring a complete disassembly or replacement thereof.

SUMMARY OF THE INVENTION

It therefore is the object of the present invention to provide a dual range variable speed transmission which overcomes the disadvantages described above.

According to the present invention, a variable diameter belt-type power transfer assembly is provided with an adjustable sheave including a pair of opposite, coaxial flanges, one of which is axially movable relative to the other. This power transfer assembly is constructed such that both flanges are provided with opposed, first belt engaging surfaces flaring radially outwardly with respect to each other so as to define a first variable diameter belt receiving groove therebetween, and opposed, second belt engaging surfaces flaring radially outwardly with respect to each other so as to define a second, variable diameter belt receiving groove therebetween. This second belt receiving groove is located radially inwardly with respect to the first belt receiving groove.

In this arrangement, one of the flanges consists of an inner flange portion and an outer flange portion which are releasably attached to each other. Each flange portion is provided with one belt engaging surface in a manner such that the outer flange portion forms one side of the outer belt receiving groove while that the inner flange portion forms one side of the inner belt receiving groove. To shift the belt from said outer to said inner groove, the outer flange portion is moved from its operative position on the inner flange portion to a retracted, inoperative position thereon and re-attached to the inner flange portion.

The present invention advantageously is applicable on combine harvesters, more specifically in the drive transmission of the cleaning fan thereon. In the preferred embodiment, a high fan velocity range is obtained by positioning the belt in the outer belt receiving groove whereas a reduced fan speed range can be used by using the inner belt receiving groove.

BRIEF DESCRIPTION OF THE DRAWINGS

A variable diameter belt type power transfer assembly in accordance with the present invention will now be described in greater detail, by way of example, with reference to the accompanying drawings, wherein.

DETAILED DESCRIPTION OF THE PREFERRED EMBODIMENT

Figure 1:
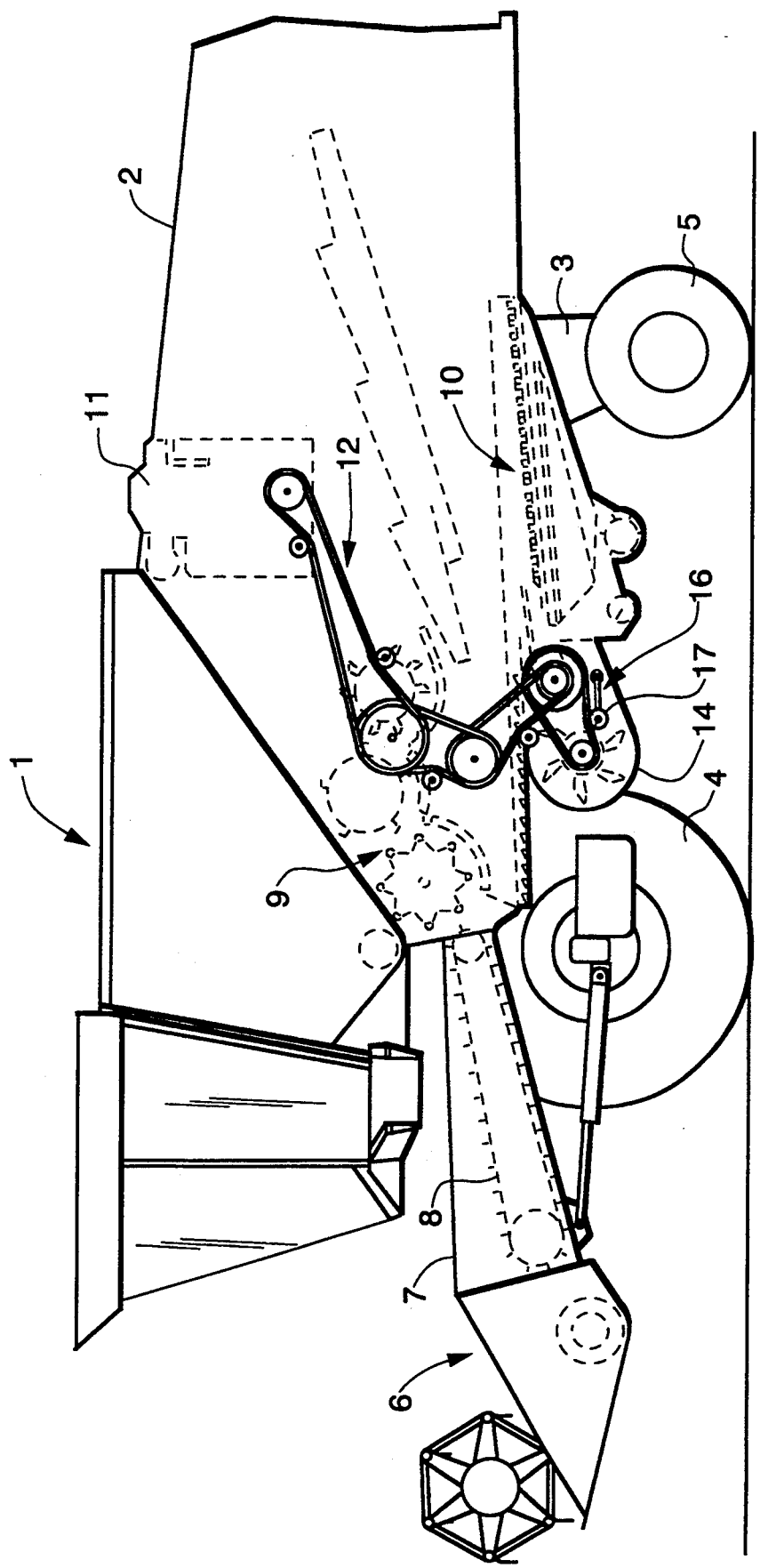
FIG. 1 is a diagrammatic side elevation view of a combine harvester incorporating the principles of the present invention.

Referring now to the drawings and, particularly, to FIG. 1, a combine harvester, generally indicated at 1, comprises a base unit 2 including a main chassis or frame 3 supported on a front pair of drive wheels 4 and a rear pair of steerable wheels 5. A conventional crop harvesting header 6 extends forwardly of the frame 3 and is operable to sever standing crop material and initiate the crop harvesting process. A straw elevator 7 interconnects the header 6 and the base unit 2 and houses a conveyor 8 for transferring severed crop material rearwardly from the header 6.

A threshing and separating mechanism 9 and a grain cleaning mechanism 10 are suitably housed within the base unit 2 rearwardly of the straw elevator 7 to receive the severed crop material therefrom and subsequently separate the edible grain from the discardable material, as is well known in the art. An engine 11 is supported by the frame 3 and is the source of driving power for operating the various components of the combine harvester 1, including serving as the prime mover. A power transfer drive train 12 transfers rotational power from the engine 11 to these driven components.

One such driven component is a fan 14 which serves to blow cleaning air through the grain cleaning mechanism 10, thereby assisting in the grain cleaning operation. Considering that a combine harvester is employable in different types of crop, the air flow rate generated by the fan 14 must be made adjustable to the nature and condition of the crop to be harvested, since otherwise, an effective and efficient cleaning operation would be hampered. To this end, a variable diameter V-belt type power transfer assembly, generally indicated at 16, is incorporated in the drive train 12 for enabling the fan speed to be adjusted infinitely within a given range.

Figure 3:
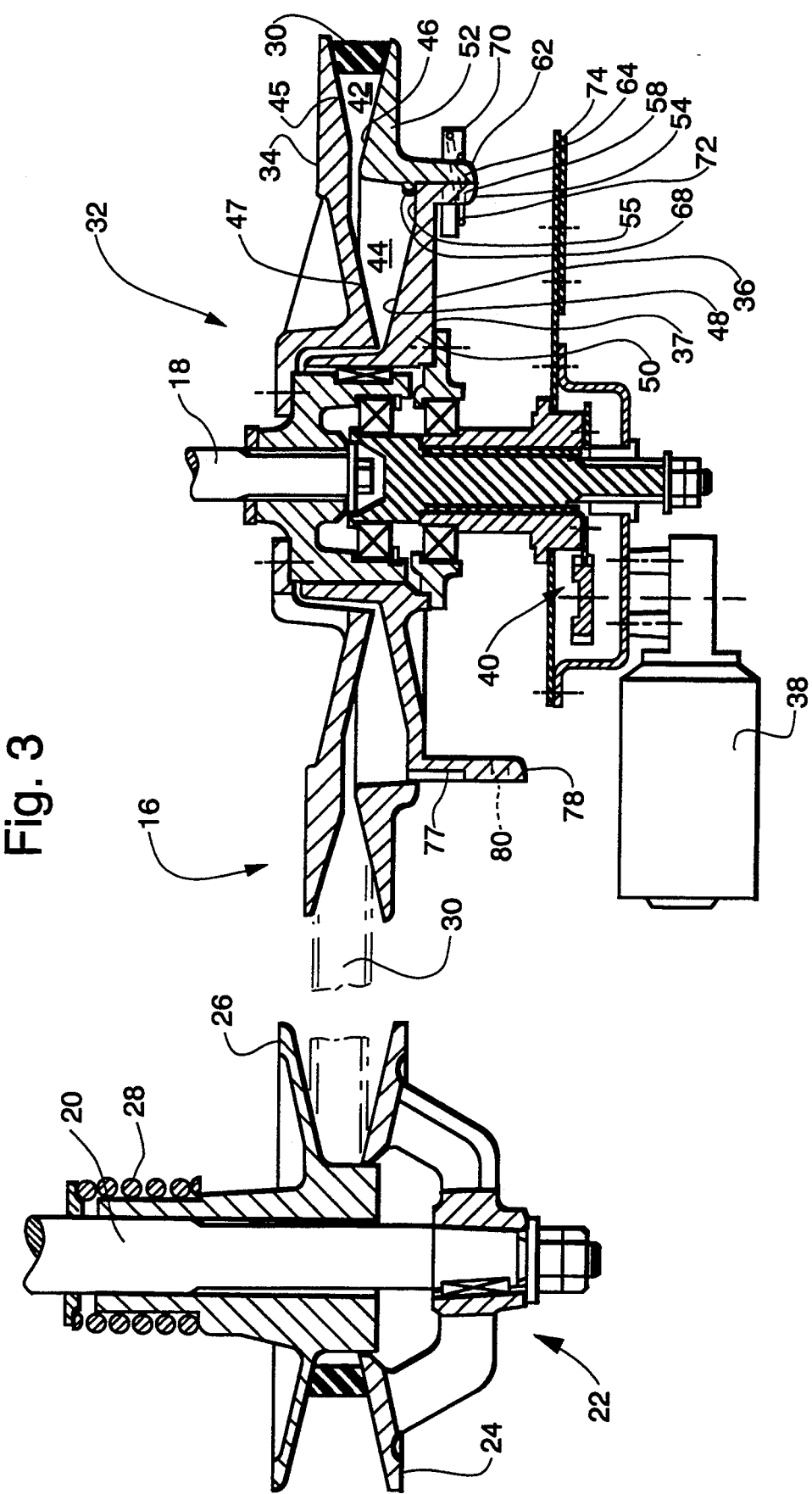
FIG. 3 is an enlarged cross sectional view of a variable diameter dual speed range belt drive transmission schematically depicted in FIG. 1 with the belt being positioned in the outer belt receiving groove.
Figure 4:
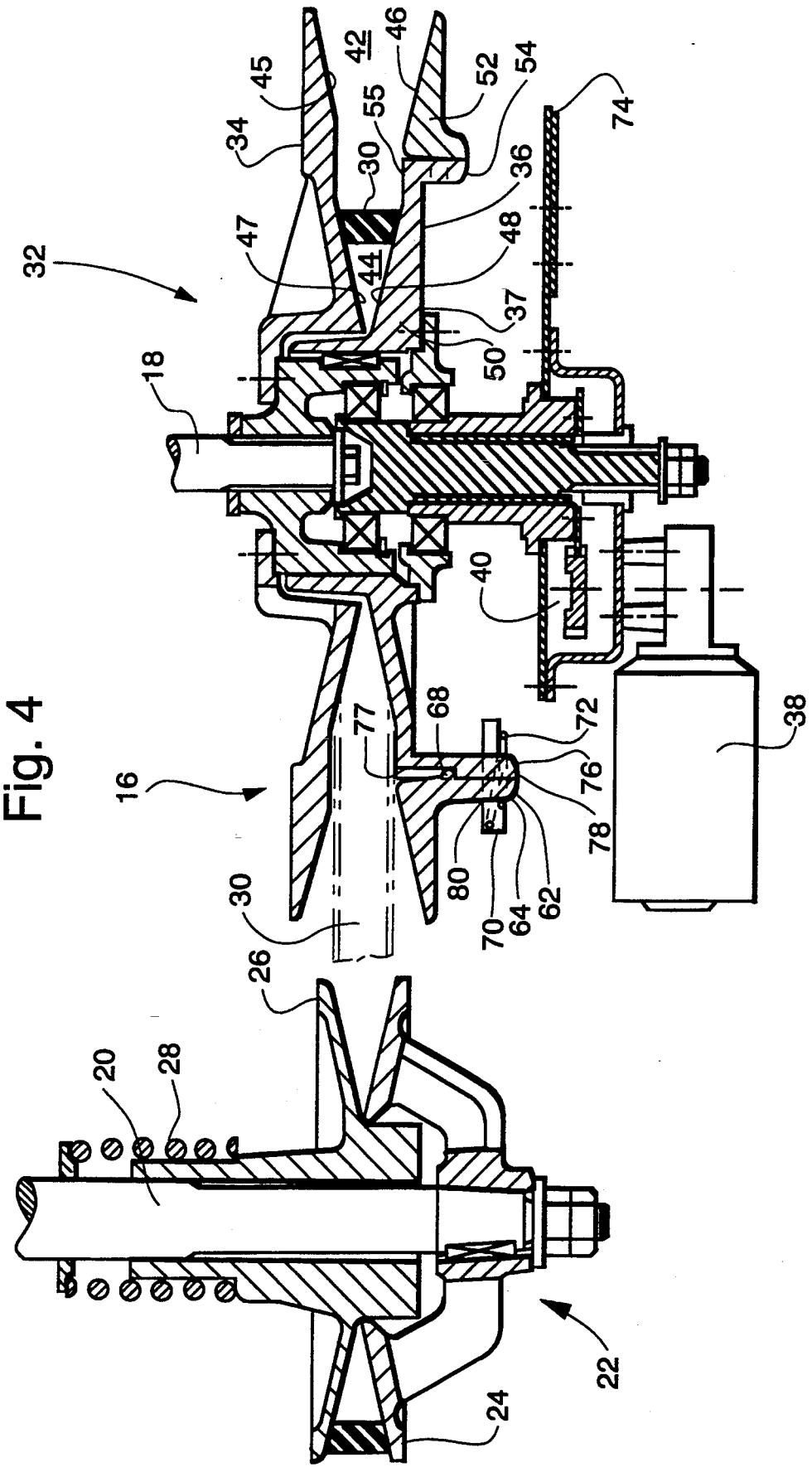
FIG. 4 is a cross sectional view of the belt drive assembly shown in FIG. 3 with the outer flange portion being relocated relative to the inner flange portion to allow the belt to be operatively positioned in the inner belt receiving groove.

Considering now FIG. 3, the variable diameter V-belt type power transfer assembly 16 is shown in greater detail. Typically, power is transmitted between an intermediate drive shaft 18, rotatably supported on the combine frame 3 and a driven fan shaft 20. A driven sheave 22 provided on the fan shaft 20 is made up of a first flange 24 fixedly secured thereto and a second flange 26 axially movable relative to the fixed flange 24. A compression spring 28, which is shouldered against a fixed support on the shaft 20, is operable to urge the movable flange 26 towards the fixed flange 24 for keeping a drive belt 30 under sufficient tension. The representation of the driven sheave 22 in FIG. 4 is depicted to reflect the operative range of movement of the drive belt 30 relative to the flanges 24, 26, rather than the proper operative position of the drive belt 30 in the driven sheave 22 corresponding to the operative position of the drive belt 30 in the drive sheave 32.

The belt 30 interconnects the above described sheave 22 with a drive sheave 32 operatively attached to the intermediate shaft 18. Said sheave 32 is comparable to the sheave 22 in that it equally comprises two flanges 34, 36 of which the flange 36 is axially movable with respect to the flange 34, which is fixedly connected to the drive shaft 18. The distance between the flanges 34 and 36 is adjustable by means of an electric motor 38 operable to axially displace the sheave 36 by the intermediary of a gear transmission, generally indicated at 40, in a manner which will be familiar to those skilled in the art and therefore will not be described in detail.

Contrary to conventional adjustable sheaves forming only one variable diameter belt receiving groove, the sheave 32 comprises a first belt receiving groove 42 adjacent the outer periphery thereof and a second belt receiving groove 44 adjacent the center of the sheave 32. The grooves 42, 44 respectively are defined by pairs of outwardly diverging belt engaging surfaces 45, 46 respectively 47, 48 provided on the opposed sidewalls of the flanges 34 and 36. For functional reasons, which will be explained in greater detail below, the flange 36 is composed of an inner flange portion 50, carrying an outer flange portion 52 releasably attached to the inner flange portion 50; the flange portions 50 and 52 respectively being provided with the belt engaging surfaces 48 and 46.

Figure 2:
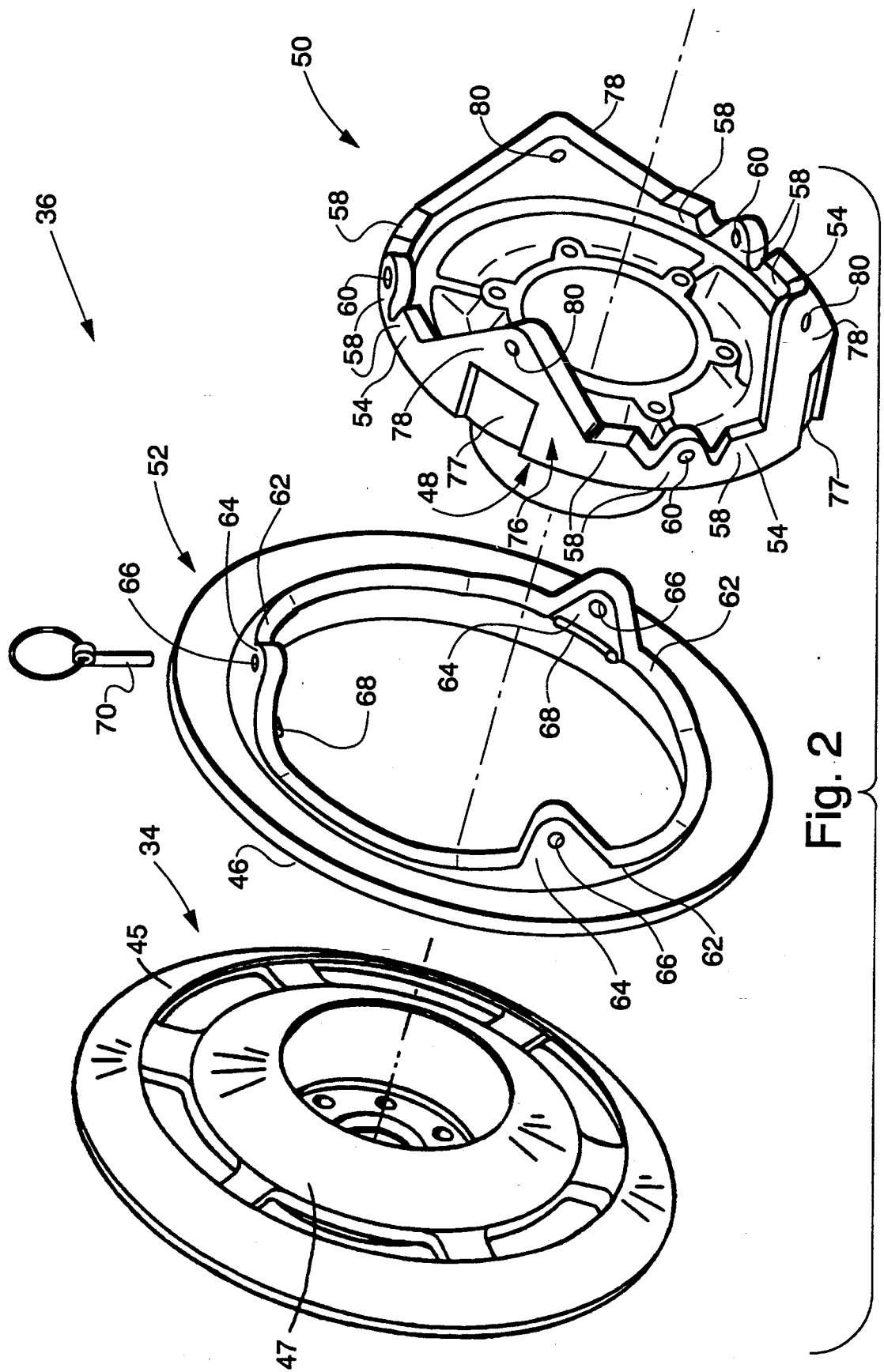
FIG. 2 represents an exploded view of the most significant components of the drive sheave shown in FIGS. 3 and 4.

Referring specifically to FIG. 2, displaying an exploded view of the main sheave parts 34, 50 and 52, it will be observed that the inner flange portion 50 is provided with three sectorial supports 54 interposed with three supplemental supports 76, described in greater detail below, all of which are equiangularly spaced around the outer periphery thereof. Each support 54 locally extends radially outwardly from the main body of the flange portion 50 and further comprises three axially extending lugs 58 which face away from the belt receiving surface 48, as best can be observed in FIG. 3, and of which the central one has an aperture at 60 in a radial direction.

The outer flange portion 52 is an annular member equally comprising three equiangularly spaced supports 62, extending axially away from the belt receiving surface 46 and located at the inner radius of said annular member and which furthermore each have a semi-circular lug 64, having an aperture at 66 in a radial direction. In addition, each support 62 is provided with a radially inwardly projecting rim 68, the benefit of which will be discussed hereinafter.

Because of the projection of the rims 68 radially inwardly from the outer flange portion 52 and the resultant interengagement between the rims 68 and the abutment surfaces 55 of the inner flange portion 50, the assembly of the drive sheave 32 requires that the outer flange portion 52 be positioned on the inner flange portion 50, preferably with the rims 68 received into the recesses 77, prior to assembling the inner flange portion 50 on the shaft 18.

As soon as the flange 34 and the inner flange portion 50, with the outer flange portion 52 loosely supported thereon, are connected to the shaft 18, the outer flange portion 52 can be moved axially relative to the inner flange portion 50 and turned radially until the supports 62 align generally with the corresponding supports 54 until the apertures 66 and 60 become aligned, whereafter lynch pins 70 are inserted therein for locking the outer flange portion 52 in a fixed position relative to the inner flange portion 50.

It will be observed that due to the fact that the supports 54 have three lugs 58 leaving notches therebetween, the rings 72 of the lynch pins 70 can be fully secured whereby they are protected by the lugs 58, as such minimizing the risk of straw clinging to them during operation in the field.

With the outer flange portion 52 in its just described mounted position and the belt 30 located in the first belt receiving groove 42, a first range of velocity ratios between the driving shaft 18 and the driven fan shaft 20 is obtainable. Indeed, for example, forcing the movable flange 50 towards the flange 34 by means of the electric motor 38, will force the belt 30 radially outwardly, as such increasing the effective diameter of the sheave 32. At the same time, the increased tension on the belt 30 forces the flanges 24 and 26 of the driven sheave 22 apart, thereby reducing the effective diameter thereof. Consequently, the operation described above leads to a situation in which the driven fan shaft 20 rotates faster than before. It readily will be appreciated that the reverse operation results in a fan speed reduction, of which a lower limit is reached when the belt 30 is positioned at the base of the first belt receiving groove 42, as shown in dashed lines in FIG. 3.

Coming back to the functional meaning of the rims 68 on the outer flange portion 52, it will be observed in FIG. 3 that axially directed forces on said flange portion 52 generated by the belt 30 are directly transmitted by said rims 68 to the radially extending abutment portions 55 of the supports 54 whereby shearing forces in the axial direction on the lynch pins 70 are totally avoided. Tangentially directed forces, experienced in the flange portion 52 due to the tensioned and rotating belt 30 pulling on the belt engaging surface 46, are counteracted by frictional forces created between the rims 68 and the abutment surfaces 55 of the supports 54 as a result of the axially directed forces on the flange portion 52. Accordingly, during normal operation of the speed transmission 16, the lynch pins 70 moreover are not subjected to tangentially directed shear forces. In fact, said pins 70 are merely provided for exceptionally rare operating conditions, such as fan blockages for example, in which high reaction forces nevertheless would tend to shift the outer flange portion 52 relative to the inner flange portion 50.

The first belt receiving groove 42 of the sheave 32 provides a fan speed adjustment within a range of approximately 550 rpm to 950 rpm, which is satisfactory for processing the so-called heavier grains such as wheat, rye, barley and corn for example. However, when harvesting light grains, such as grass seed, which are susceptible of being blown out of the combine and as such would be lost, a further reduced fan speed is desired. To this end, the sheave 32 is provided with the second belt receiving groove 44, the effective diameter of which is variable between values which are smaller than the obtainable effective diameters of the first belt receiving groove 42 and provide a fan speed range in the order of 290 rpm to 510 rpm.

To make the second belt receiving groove 44 operational, as depicted in FIG. 4, the outer flange portion 52 must be relocated from its attached operative position shown in FIG. 3 to a retracted position shown in FIG. 4. It will be understood by one skilled in the art that the slack and tensioned strands of the belt 30 extending from the groove 44 in the direction of the driven sheave 22 would interfere with the mounted flange portion 52 if not relocated in a manner defined below. Relocation of the mounted flange portion 52 to permit the belt 30 to operate within the inner belt receiving groove 44 can be easily accomplished by withdrawing the lynch pins 70 interconnecting the corresponding supports 54 and 62 through apertures 60, 66. The mounted flange portion 52 can then be rotated relative to the inner flange portion 50 through an angular rotation of approximately 60 degrees until the rims 68 are aligned with the recesses 77 in the supplemental supports 76.

With the rims 68 aligned with corresponding recesses, the outer flange portion 52 can be axially moved relative to the inner flange portion 50 until the rims 68 bottom out in the recesses 77, whereupon the apertures 66 will be alignable with the apertures 80 in the supplemental lugs 78 forming part of the supports 76, which are equiangularly spaced around the periphery of the outer flange portion 52 between the first lugs 58. A reinsertion of the lynch pins 70 through the corresponding aligned apertures 66, 80 will fix the outer flange portion 52 in a retracted position that will allow the belt 30 to be free to operate within the second belt receiving groove 44.

The return of the outer flange portion 52 to its operating position to form the first belt receiving groove 42 involves only a reversal of the procedure described above. The lynch pins 70 are withdrawn to permit axial displacement of the outer flange portion 52 relative to the inner flange portion 50 until the rims 68 are cleared out of the recesses 77. The outer flange portion 52 can then be rotated through an angular displacement of approximately 60 degrees to re-align the rims 68 with the corresponding abutment portions 55 of the supports 54 and to re-align the apertures 60, 66. A re-insertion of the lynch pins 70 through the apertures 60, 66 returns the outer flange portion 52 to the operative position whereupon the drive belt 30 can be positioned within the outer belt receiving groove 42 for operation as described above.

Referring again to FIG. 3, it will be seen that the belt receiving groove 44 is axially offset from the groove 42, which means that, if the first groove 42 is aligned with the driven sheave 22, then the second groove 44 inevitably is misaligned therewith. However, when using the second belt receiving groove 44, only the lower range of fan speeds, providing a low power transfer, is obtainable, meaning that a slight misalignment of the drive sheave 32 and the driven sheave 22 will not severely influence the belt life.

In all described embodiments where the drive and driven shafts 22, 20 are at a fixed center distance, the power transfer assembly 16 is designed in such a manner that an idler pulley for tensioning the belt is not necessary when the belt 30 is running in the first belt receiving groove 42. However, when using the second belt receiving groove 44 of which the effective diameter is considerably smaller than of said first groove 42, a surplus of belt length is created which cannot be taken up by the cooperating action of the sheaves 22 and 32. Therefore, an additional idler pulley 17, best seen in FIG. 1, is adjustably secured to the frame 3 and is operable only when applying the low fan speed range for taking up said surplus of belt length.

While the preferred structures, in which the principles of the present invention have been incorporated, are described above and partially shown in the accompanying drawings, it is to be understood that the invention is not to be limited to the particular details as described above and shown in said drawings, but that, in fact, widely different means may be employed in the practice of the broader aspects of the invention.

As an example, it is very well conceivable that a variable diameter belt type power transfer assembly according to the invention is not only incorporated in the combine fan drive but also provides motive power to any other rotating component requiring an adjustable speed. In fact, the application of the present invention should not be limited to combine harvesters only, but may be extended to any type of agricultural and industrial machine using variable diameter power transfer means, irrespective of whether such means are electrically or hydraulically controlled. Although the high and low speed ranges as defined above leave a gap of unattainable speeds therebetween, it is very well conceivable that the highest speed of the low speed range equals the lowermost speed of the high speed range.

The foregoing is accomplished by reducing the idle space between the first and second belt receiving grooves 42 and 44, which may result in the high and low speed ranges partially overlapping. This is indeed possible considering that shifting the belt 30 from the bottom of the first groove 42 towards a reduced diameter at the top of the second groove 44 in the drive sheave 32 results in a comparable action in the driven sheave 22 where the belt 30 is forced from its outermost course towards its innermost course, effected by the incorporation of the additional idler pulley already mentioned. Accordingly, when the reduction of the effective diameters in terms of percentage is larger in the driven sheave 22 than in the drive sheave 32, then the obtainable speed ranges indeed may overlap. Such an overlap may provide advantages in that intermediate required speeds can be obtained by either one of the two configurations, as such postponing or even obviating the need of changing from one configuration to the other.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a variable diameter belt-type power transfer assembly having a drive belt engageable with an adjustable sheave including a pair of opposing, coaxial flanges, one of said flanges being axially movable relative to the other said flange, the improvement comprising:

both said flanges having opposed first belt engaging surfaces flaring radially outwardly with respect to each other so as to define a first, variable diameter belt receiving groove therebetween, and opposed second belt engaging surfaces flaring radially outwardly with respect to each other so as to define a second, variable diameter belt receiving groove therebetween, said second belt receiving groove being located radially inwardly with respect to said first belt receiving groove; and one of the flanges including an outer flange portion provided with one of said first belt engaging surfaces and an inner flange portion provided with one of said second belt engaging surfaces, said outer flange portion being releasably attached to said inner flange portion and being selectively movable between an operative position in which said drive belt is operable within said first belt receiving groove and a retracted position to allow said drive belt to be operable within said second belt receiving groove.

2. The assembly of claim 1 wherein the inner flange portion includes first axially extending lugs equiangularly spaced around the outer periphery thereof, the outer flange portion including axially extending supports equiangularly spaced around the inner periphery thereof and shaped to fit on corresponding said first lugs of the inner flange portion, and each corresponding pair of first lugs and supports being provided with radially directed apertures cooperable with a lynch pin insertable therethrough for releasably attaching the outer flange portion to the inner flange portion in said operative position to form said first belt receiving groove.

3. The assembly of claim 2 wherein the inner flange portion further includes supplemental lugs equiangularly spaced around the outer periphery thereof in alternating fashion with said first lugs, said supplemental lugs being provided with radially directed apertures selectively alignable with the apertures in said supports to be cooperable with said lynch pin to fix said outer flange portion in said retracted position to allow said drive belt to operate in said second belt receiving groove.

4. The assembly of claim 3 wherein each support of the inner flange portion includes a radially extending abutment surface, said outer flange portion is provided with a radially inwardly projecting rim which, in the mounted, operative position of the outer flange portion on the inner flange portion, registers with the corresponding said inner flange portion abutment surface such that the rims are operable to transmit axial forces exerted by the drive belt on the outer flange portion to the first supports of the inner flange portion.

5. The assembly of claim 4 wherein each said supplemental lugs are provided with a recess to receive a corresponding said rim and allow said outer flange portion to be axially movable relative to said inner flange portion to selectively align the supports of said outer flange portion with said supplemental lugs to relocate said outer flange portion in said retracted position.

6. The assembly of claim 5 wherein said supplemental lugs extend axially longer than said first lugs.

* * * * *